(12) United States Patent
Scheibner et al.

(10) Patent No.: US 9,238,203 B2
(45) Date of Patent: Jan. 19, 2016

(54) MICROPERFORATED POLYMERIC FILM AND METHODS OF MAKING AND USING THE SAME

(75) Inventors: John B. Scheibner, Woodbury, MN (US); Brent R. Hansen, New Richmond, WI (US); David F. Slama, Grant, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 197 days.

(21) Appl. No.: 13/514,336

(22) PCT Filed: Dec. 14, 2010

(86) PCT No.: PCT/US2010/060160
§ 371 (c)(1),
(2), (4) Date: Jun. 7, 2012

(87) PCT Pub. No.: WO2011/081894
PCT Pub. Date: Jul. 7, 2011

(65) Prior Publication Data
US 2012/0244314 A1    Sep. 27, 2012

Related U.S. Application Data

(60) Provisional application No. 61/286,102, filed on Dec. 14, 2009.

(51) Int. Cl.
- *B28B 1/48* (2006.01)
- *B01D 67/00* (2006.01)
- *B01D 69/02* (2006.01)

(52) U.S. Cl.
CPC ............ *B01D 67/0023* (2013.01); *B01D 69/02* (2013.01); *B01D 2323/42* (2013.01);
(Continued)

(58) Field of Classification Search
USPC .......... 264/154, 139, 153, 155, 156, 44, 509, 264/119, 555, 556, 557, 558
See application file for complete search history.

(56) References Cited

U.S. PATENT DOCUMENTS

| 3,560,601 A | 2/1971 | Johnson et al. |
| 4,248,822 A | 2/1981 | Schmidt |

(Continued)

FOREIGN PATENT DOCUMENTS

| GB | 851473 | 10/1960 |
| GB | 1073605 | 6/1967 |

(Continued)

OTHER PUBLICATIONS

PCT International Search Report, PCT/US2010/060160, dated May 24, 2011, 6 pages.

*Primary Examiner* — Stella Yi
(74) *Attorney, Agent, or Firm* — Julie Lapos-Kuchar (57) ABSTRACT

Described herein are microperforated polymeric films comprising: opposed first and second surfaces separated by a first certain distance (40*a*); and a plurality of channels perpendicular to the first and second surfaces, wherein a first opening (20*a-c*) of a channel intersects the first surface and a second opening (22*a-c*) of the channel intersects the second surface; wherein the diameter of the first opening is larger than the diameter of the second opening and the second openings on the second surface are spaced apart by a second certain distance (50*a*); wherein the ratio of the first certain distance to the second certain distance is at least 0.25; and further wherein the second surface has an open area of at least 10%. Also described are methods of making and using such microperforated polymeric films.

8 Claims, 8 Drawing Sheets

(52) U.S. Cl.
CPC ....... *B01D2325/02* (2013.01); *B01D 2325/021* (2013.01); *Y10T 428/24273* (2015.01); *Y10T 428/24322* (2015.01)

(56) References Cited

U.S. PATENT DOCUMENTS

| | | | |
|---|---|---|---|
| 4,252,516 | A | 2/1981 | Raley et al. |
| 4,919,810 | A | 4/1990 | Itoh et al. |
| 5,115,972 | A | 5/1992 | Maier et al. |
| 5,733,628 | A | 3/1998 | Pelkie |
| 5,948,255 | A | 9/1999 | Keller et al. |
| 6,598,701 | B1 | 7/2003 | Wood et al. |
| 6,599,612 | B1 | 7/2003 | Gray |
| 6,617,002 | B2 | 9/2003 | Wood |
| 6,660,361 | B1 | 12/2003 | Shimalla |
| 7,037,100 | B2 | 5/2006 | Strobel et al. |
| 2001/0050197 | A1* | 12/2001 | Wood .......................... 181/292 |
| 2005/0073070 | A1 | 4/2005 | Getschel et al. |
| 2005/0104245 | A1 | 5/2005 | Wood |
| 2006/0049099 | A1 | 3/2006 | Chang |
| 2006/0125139 | A1 | 6/2006 | Strobel et al. |
| 2006/0127639 | A1 | 6/2006 | Strobel et al. |

FOREIGN PATENT DOCUMENTS

| | | |
|---|---|---|
| RU | 2050930 | 12/1995 |
| RU | 2327510 | 6/2008 |
| WO | 01/19528 | 3/2001 |
| WO | 02/20668 | 3/2002 |
| WO | 2006/055138 | 5/2006 |
| WO | 2006/058384 | 6/2006 |
| WO | 2007/127890 | 11/2007 |
| WO | 2007/127891 | 11/2007 |
| WO | 2010/088010 | 8/2010 |

\* cited by examiner

MICROPERFORATED POLYMERIC FILM AND METHODS OF MAKING AND USING THE SAME

CROSS REFERENCE TO RELATED APPLICATIONS

This application is a national stage filing under 35 U.S.C. 371 of PCT/US2010/060160, filed Dec. 14, 2010, which claims priority to U.S. Provisional Application No. 61/286,102, filed Dec. 14, 2009, the disclosure of which is incorporated by reference in its entirety herein.

TECHNICAL FIELD

A novel microperforated polymeric film is described comprising a high percentage of open area and a high density of perforations. Methods of making and using these microperforated polymeric films are described. For example, these microperforated polymeric films may be used to filter particulates.

BACKGROUND

Various methods for making perforated polymeric films are known. Generally the perforated polymeric films previously have been fabricated with either a high percent open area or a high thickness to hole spacing ratio, but not both. The percent open area is a relative measure of how much filter media area is needed to accommodate a flow rate. Generally, a larger percent open area is preferred because it can accommodate a greater flow rate in a smaller area. The ratio of film thickness to the shortest distance between adjacent holes is a relative measure of the physical strength of the microperforated polymeric film and the perforation density. A larger ratio is preferred because it indicates superior strength and durability while having closely located holes.

For example, G.B. Pat. No 851,473 generally describes the process of perforating a thermoplastic polymeric material by melting the material at selected localized areas, while simultaneously cooling other areas of the polymeric material to prevent them from melting. Using a ¼ mil (6.4 micrometers) polymer film, holes 33 mils (838 micrometers) in diameter were able to be fabricated with approximately 237 holes per square inch, equating to a ratio of film thickness to the shortest distance between adjacent holes of 0.007 and an open area of 20%. Using a 2 mil (50.8 micrometers) polymer film, holes 250 mils (6350 micrometers) in diameter were able to be fabricated with approximately 8 holes per square inch, equating to a ratio of film thickness to the shortest distance between adjacent holes of 0.015 and an open area of 39%.

G.B. Pat. No. 1,073,605 (Rowley) describes the process of perforating thin thermoplastic films containing recesses. The films, recess-side down are passed around a chilled cylinder while exposing the other side to the heat of a flame. The chilled cylinder cools the film, as the heat selectively melts the bottoms of the recesses, perforating the film. This patent discloses polymeric film thickness of 0.100 inches (2540 micrometers) and 400 recesses per square inch having a diameter of ¹⁄₆₄ of an inch (396 micrometers), equating to a ratio of film thickness to the shortest distance between adjacent holes of 2.6 and an open area of 8%.

U.S. Pat. No. 3,560,601 (Johnson, et al.) describes the process of perforating a fabric backed polyvinyl chloride material by first embossing the material to create depressions in the material and then contacting the material with heated air to remove the thin sections remaining at the bottoms of the depressions.

SUMMARY

A low cost process for making polymer films having perforations that are both precisely shaped and densely located to achieve a high percent open area is desired. A novel feature of the process disclosed herein is the use of a fluid, which is believed to enhance cooling of the embossed polymeric film during the thermal treatment, enabling the manufacture of films having densely located and precisely shaped perforations.

In one aspect, a method of forming a microperforated polymeric film is disclosed comprising providing a polymeric film comprising opposed first and second surfaces and a plurality of cavities there between, wherein the plurality of cavities is open to the first surface and includes a cavity surface wherein the cavity surface intersects the first surface; providing a fluid between a support surface and the first surface; and exposing the second surface to a thermal treatment to perforate the polymeric film in the areas covering the plurality of cavities.

In one embodiment of the method, a layer of gas separates the fluid from the apex of at least some of the plurality of cavities.

In one embodiment of the method, the support surface comprises a textured or coated surface.

In one aspect, an article made by the method of forming a microperforated polymeric film is disclosed comprising providing a polymeric film comprising opposed first and second surfaces and a plurality of cavities there between, wherein the plurality of cavities is open to the first surface and includes a cavity surface wherein the cavity surface intersects the first surface; providing a fluid between a support surface and the first surface; and exposing the second surface to a thermal treatment to perforate the polymeric film in the areas covering the plurality of cavities.

In another aspect, a microperforated polymeric film is disclosed comprising: (i) opposed first and second surfaces separated by a first certain distance; and (ii) a plurality of channels perpendicular to the first and second surfaces, wherein a first opening of each channel intersects the first surface and a second opening of each channel intersects the second surface; wherein the diameter of the first opening is larger than the diameter of the second opening and the second openings on the second surface are spaced apart by a second certain distance; wherein the ratio of the first certain distance to the second certain distance is at least 0.25, and further wherein the second surface has an open area of at least 10%.

In one embodiment, the microperforated polymeric film is a polyolefin.

In another aspect, a microperforated polymeric film is disclosed comprising: (i) opposed first and second surfaces; and (ii) a plurality of channels perpendicular to the first and second surfaces, wherein a first opening of each channel intersects the first surface and a second opening of each channel intersects the second surface; wherein the diameter of the first opening is larger than the diameter of the second opening; and the wherein the second surface has an open area of at least 20%; and further wherein the second surface comprises at least 6,000 openings per square inch (930 openings per square centimeter).

In another aspect, a multilayered filter device is disclosed comprising: a microperforated polymeric film as disclosed herein and a second permeable material extending across at least a portion of the microperforated polymeric film.

In yet another aspect, a method of filtering particulates is disclosed comprising providing a microperforated polymeric film comprising: (a) opposed first and second surfaces separated by a first certain distance; and (ii) a plurality of channels perpendicular to the first and second surfaces, wherein a first opening of the channel intersects the first surface and a second opening of the channel intersects the second surface; wherein the diameter of the first opening is larger than the diameter of the second opening and the second openings on the second surface are spaced apart by a second certain distance; wherein the ratio of the first certain distance to the second certain distance is at least 0.25, and further wherein the second surface has an open area of at least 10%; (b) providing a mixture comprising particulates; and (c) contacting the mixture to the microperforated polymeric film so as to filter the mixture.

The above summary is not intended to describe each embodiment. The details of one or more embodiments of the disclosure are also set forth in the description below. Other features, objects, and advantages will be apparent from the description and from the claims.

DETAILED DESCRIPTION

As used herein, the term
"a", "an", and "the" are used interchangeably and mean one or more; and
"and/or" is used to indicate one or both stated cases may occur, for example A and/or B includes, (A and B) and (A or B).

Also herein, recitation of ranges by endpoints includes all numbers subsumed within that range (e.g., 1 to 10 includes 1.4, 1.9, 2.33, 5.75, 9.98, etc.).

Also herein, recitation of "at least two" includes all numbers of two and greater (e.g., at least 4, at least 6, at least 8, at least 10, at least 25, at least 50, at least 100, etc.).

Also herein, recitation of "at least one" includes all numbers of one and greater (e.g., at least 2, at least 4, at least 6, at least 8, at least 10, at least 25, at least 50, at least 100, etc.).

The present description provides embodiments of a microperforated polymeric film and methods for perforating polymeric films using thermal treatments wherein the microperforated polymeric film is thick and comprises a high density of perforations and a high percent open area. The thick polymer film provides strength to the resulting article, while the high percent open area enables these microperforated polymeric films to be used in high throughput applications such as particulate filtering or acoustics.

Microperforated Polymeric Films

Microperforated films according to the present disclosure may be formed from various materials such as, for instance, polymeric materials. While many types of polymeric materials may be used, a particularly advantageous method of manufacturing a microperforated film utilizes thermoplastic materials.

Figure 1A:
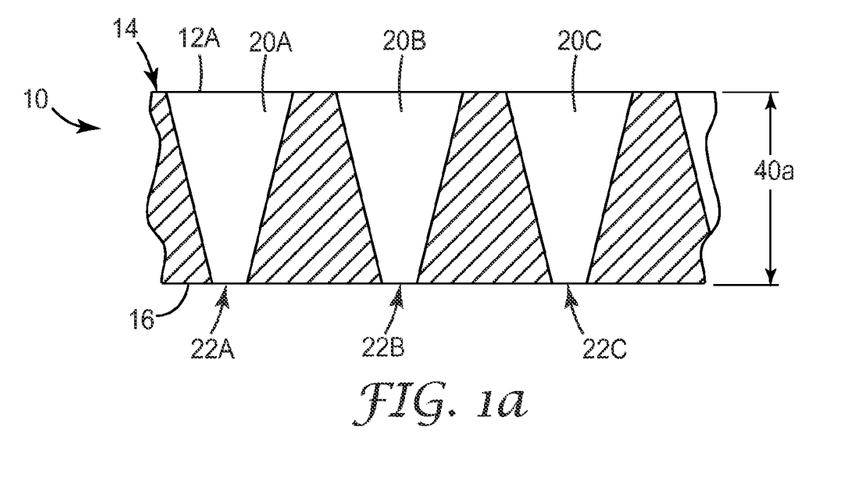
FIG. 1a is schematic cross-sectional view of microperforated polymeric film 10 according to one exemplary embodiment of the present disclosure.
Figure 1B:
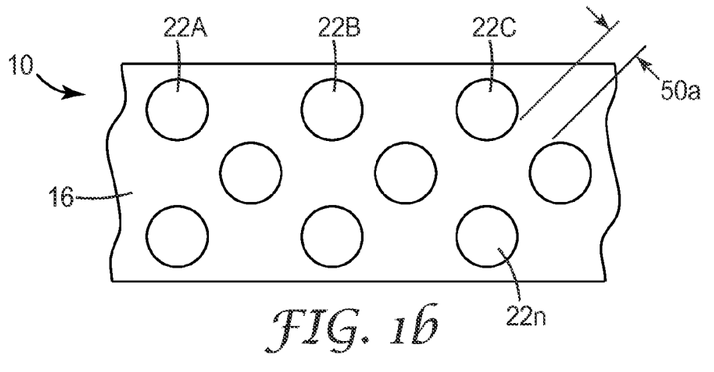
FIG. 1b is a schematic top view of microperforated polymeric film 10 according to one exemplary embodiment of the present disclosure.

The microperforated films of the present disclosure may be understood by reference to FIGS. 1a and 1b. FIG. 1a depicts a cross-sectional view of one embodiment of a microperforated film of the present disclosure. Microperforated polymeric film 10 comprises channels 20A, 20B, and 20C (collectively plurality of channels 20) perpendicular to a first surface and an opposing second surface. As shown in FIG. 1a, microperforated polymeric film 10 comprises first surface 14 and second surface 16. Each channel (e.g., 22A) of the plurality of channels comprises a first opening (e.g., 12A), which intersects first surface 14 and a second opening (e.g., 22A), which intersects second surface 16, creating a through opening. FIG. 1b depicts a top view of second surface 16, showing second openings 22A, 22B, 22C ... 22n (collectively plurality of openings 22).

The shape and dimensions of the openings are not particularly limited. The openings of the channels may be elliptical, round, circular, oval, triangular, square, hexagonal, octagonal, etc. In one embodiment, the opening of a channel intersecting the first surface (e.g., first opening 12A) is a different size and/or shape than the opening of that same channel intersecting the second surface (e.g., second opening 22A). For non-circular openings, the term diameter is used herein to refer to the diameter of a circle having the equivalent area as the non-circular cross-section. The diameter of the first opening may be at least 100, 200, or even 500 micrometers; at most 100, 200, 500, or even 2000 micrometers. The diameter of the second opening may be at least 50, 100, 200, or even 500 micrometers; at most 100, 200, 500, or even 1000 micrometers. Due to the processing, the diameter of the first opening (e.g., 12A) may be larger than the diameter of the second opening (e.g., 22A) on the second surface (i.e., the thermal treated surface).

The shape and dimensions of the channels are also not particularly limited and may be influenced by the tooling and processing conditions (e.g., film tension and thermal treatment exposure). In some embodiments, the plurality of channels is substantially perpendicular to the first and second surfaces (i.e., the channel is at most 2, 5, 10, 15, or even 20 degrees off axis due to processing of the film). Each channel in the plurality of channels may comprise any shape, including, for example, cylindrical or a geometric prism (e.g., a hexagonal prism, a square prism, etc.). The shape of the channel may be slightly distorted due to the thermal treatment process. In one embodiment, the channels are tapered.

In one embodiment, the microperforated polymeric film comprises at least 1000, 2000, 4000, 5000, 6000, 7000, 8000, 10000, or even 25000 channels per square inch. The plurality of channels in the microperforated polymeric film may be ordered or random. For example, a square array may be used; alternatively, a staggered array (for example, a hexagonal array) may be used, in order to increase the density of the perforations. The opening size, shape, and/or spacing may also vary over the microperforated polymeric film if desired.

Given the density of channels and the diameter of the openings, microperforated polymeric films of the present disclosure comprise at least 8, 10, 15, 20, 22, 25, 30, 35, 40, 50, or even 60% open area. Open area as used herein is in reference to the second surface and is defined as the sum total of the area occupied by the second openings for a given area of the second surface.

In one embodiment, the microperforated polymeric film comprises a film thickness of 75 to 500 micrometers. The film thickness is measured as the maximum distance between the first surface and the second surface on the microperforated polymeric film. In FIG. 1, film thickness 40a is the distance between the first surface and the second surface of microperforated polymeric film 10. As used herein, this distance will be referred to as "the first certain distance" and is the maximum distance between the first surface and second surface of the microperforated polymeric film. Typically, the first certain distance is at least 50, 60, 70, 75, 80, or even 100 micrometers; at most 100, 150, 200, 300, 400, 500, 750, or even 800 micrometers.

In one embodiment, the second openings on the second surface are spaced apart by a certain distance, represented as distance 50a in FIG. 1b of at least 20, 25, 30, 40, 50, 60, 75, or even 100 micrometers; at most 75, 80, 90, 100, 125, 150, 175, 200, 300, 400, or even 500 micrometers. As used herein, this distance will be referred to as "the second certain distance" and is the minimum distance between adjacent openings on the second surface.

In one embodiment, the ratio of the first certain distance to the second certain distance is greater than 0.25, 0.5, 1, 2, 3, or even 3.5.

Fabrication of the Microperforated Polymeric Film

Figure 2:
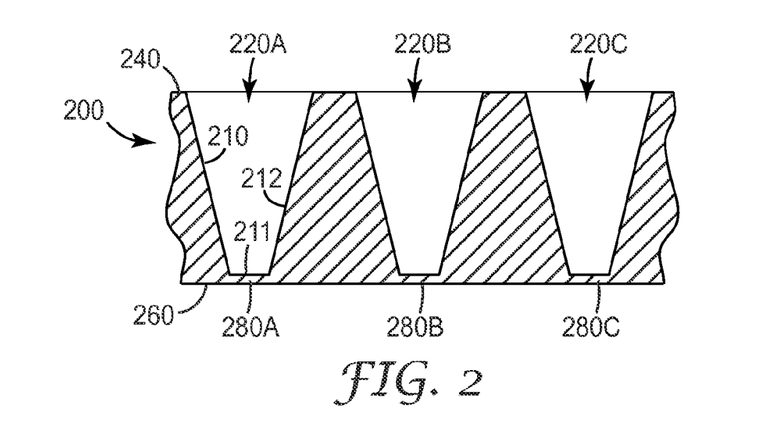
FIG. 2 is schematic cross-sectional view of embossed polymeric film 200 according to one exemplary embodiment of the present disclosure.

The microperforated polymeric films of the present disclosure are made from embossed polymeric films (i.e., polymeric films comprising cavities), which are exposed to thermal treatment processes to perforated the polymeric films. To better understand the present disclosure, depicted in FIG. 2 is a cross-sectional view of one exemplary embossed polymeric film used in the present disclosure. Embossed polymeric film 200 comprises cavities 220A, 220B, and 220C (collectively plurality of cavities 220). Each cavity comprises a cavity surface (e.g., 210, 211, and 212). The cavities are perpendicular to a first surface 240 and an opposing second surface 260. As shown in FIG. 2, skins 280A, 280B, and 280C (collectively plurality of skins 280) refer to the small membrane of polymeric material (i.e., skin) located between the bottom (or apex) of each cavity and second surface 260. During exposure of second surface 260 to a thermal treatment process, the skins, or a portion thereof, melt and retract and/or combusts, resulting in through openings or channels (e.g., channel 20A as depicted in microperforated polymeric film 10 in FIG. 1a). Note: FIGS. 1a, 1b, and 2 are not drawn to scale and are for illustrative purposes only.

In the traditional method of thermal treatment of embossed polymeric film, the embossed polymeric film is wrapped (skin-side facing out) around a support surface while the outside of the film is exposed to a thermal treatment. The thermal treatment heats the outermost layers of polymer leading to the displacement of the skins. Although not wanting to be limited by theory, it is believed that the skins are melted and the molten polymer retracts, creating a through opening in the polymer. The support surface is typically a smooth chill roller, which is used to keep the polymeric film cool when exposed to the thermal treatment to precisely control the temperature of the polymeric film.

In the present disclosure, because of the high percentage of open area, and/or the thickness of the polymeric film, when applying the methods as disclosed in for example, U.S. Publ. No. 2005/0104245 (Wood), the resulting polymeric film demonstrated uncontrolled melting, as shown in Comparative Example A below.

Applicants have discovered that for fabrication of the microperforated polymeric films disclosed herein, the chill roll does not provide adequate cooling of the polymeric film during the thermal treatment process. Applicants have found that the addition of a fluid between the embossed polymeric film and the support surface (e.g., chill roll) results in microperforated polymeric films with well controlled perforations.

Although not wanting to be limited by theory, it is believed that the temperature of the polymeric film cannot be controlled well enough during the thermal treatment to balance the melting of the skins while keeping enough of the polymeric film cool to maintain its strength and dimensional integrity. Because of the patterning of the embossed polymeric film (e.g., larger diameter openings spaced close together), in some embodiments less than 30, 25, 20, 10, or even 5% of the polymeric material is in direct contact with the support surface (e.g., the chill roll). The fluid is thought to act as a heat transfer agent, helping to keep all but the outermost layers of the polymeric film sufficiently cool such that when the embossed polymeric film is exposed to the thermal treatment step, there is not uncontrolled melt. By controlling how the fluid is applied, the first surface of the embossed polymeric film can be substantially coated with fluid, while entrapping a layer of gas (e.g., air) between the fluid and the apex of each cavity. The gaseous layer is believed to insulate the skins from the cool under-layers, allowing the controlled melting of the skins.

Described below is the process of forming a microperforated polymeric film according to the present disclosure.

In one embodiment, the process for fabricating a microperforated polymeric film includes, forming the polymeric material, contacting the formed polymeric material with a tooling, hardening the polymeric material on the tooling, removing the embossed polymeric material from the tooling, and then displacing the skins Forming the Polymeric Material Forming a polymeric material may include selecting the type of polymer and additives, if any. Typically the polymeric material comprises a polyolefin, such as for example, polyethylene or polypropylene, and combinations thereof. Copolymers (a polymer comprising at least two different interpolymerized monomers and include: terpolymers (comprising three different monomers), tetrapolymers (comprising four different monomers), etc.) and blends may also be used. An exemplary copolymer is a propylene ethylene copolymer.

The type and amount of additives can vary and are typically selected in consideration of the desired properties of the microperforated polymeric film (for example, sound absorbance or filtering) as well as other characteristics of the film, such as for example, color, printability, adherability, smoke generation resistance, and heat/flame retardancy. For example, a color code may be developed (i.e., a particular color corresponds to a particular perforation size) and colorants may be added to the polymeric film during the manufacturing process to indicate a particular perforation size. Additives may also be added to a polymeric material to increase its bending stiffness and/or surface density.

The type of polymer as well as the specific physical characteristics (e.g., thickness, bending stiffness, surface density, opening diameter, opening spacing, and/or opening shape) of the film can vary. Typically, the polymeric film has a substantially uniform thickness over the entire film. That is, the film has a uniform thickness with the exception of possible variations in the vicinity of the microperforations, which may result from the process of forming the microperforations and/or displacing of thin skins, and natural variations in the manufacturing processes discussed below.

Contacting the Formed Polymeric Material with a Tooling

The polymeric material may be contacted with a tool having features that are shaped and arranged to form cavities in the polymeric material, for example a tooling comprising projections. The cavities formed in the polymeric material will provide the desired properties (for example, filtering, and sound absorption) of the microperforated polymeric film. The polymeric material may be contacted with the tooling using a number of different techniques such as, for example, embossing, including extrusion embossing or compression molding. The polymeric material may be in the form of a molten extrudate, which is brought in contact with the tooling, or in the form of a pre-formed film, which is heated and placed into contact with the tooling. Typically, the polymeric material is first brought to an embossable state by heating the polymeric material above its softening point, melting point, or polymeric glass transition temperature. The polymeric material is then brought in contact with the tooling to which the polymeric material generally conforms.

The tooling typically includes a base surface from which the features (e.g., projections) extend. The shape and surface of the projection is not particularly limited, however, the following may be considered when designing the projections. First, the projection shape may be limited by the ease of machining. Second, the projection shape may be designed to facilitate the removal of the embossed polymeric film. For example, an appropriate draft angle greater than at least 0.5 degrees may be designed into the projection to ensure proper removal of the resulting embossed polymeric film from the tooling. This is particularly important when the design involves a projection having nearly straight walls. Third, the projections may be designed to provide a resulting microperforated polymeric film that is effective for its intended use (e.g., particulate filtering, acoustics, etc.).

The projections may be machined using techniques known in the art, for example, milling, cutting, grinding, chemically etching, electrode discharge machining, electrochemical etching, laser ablation, focused ion beam machining, or combinations thereof.

Because the tooling is a negative mold for the embossed polymeric film, the shape, dimensions, and arrangement of the features on the tool are suitably selected in consideration of the desired properties of the cavities to be formed in the embossed polymeric material and the subsequent channels of the microperforated polymeric film.

In one embodiment, projections on the tooling have a height corresponding to the desired film thickness and have edges that taper from a widest diameter to a narrowest diameter to provide tapered cavities.

Hardening the Polymeric Material on the Tooling and Removing the Embossed Polymeric Material from the Tooling After contacting the flowable polymeric material with the tooling, the polymeric material is solidified to form a solidified polymeric film having features corresponding to the tool. The polymeric material typically solidifies while in contact with the tool. After solidifying, the solidified polymeric film is then removed from the tool. The resulting embossed film comprises a plurality of cavities.

Figure 3:
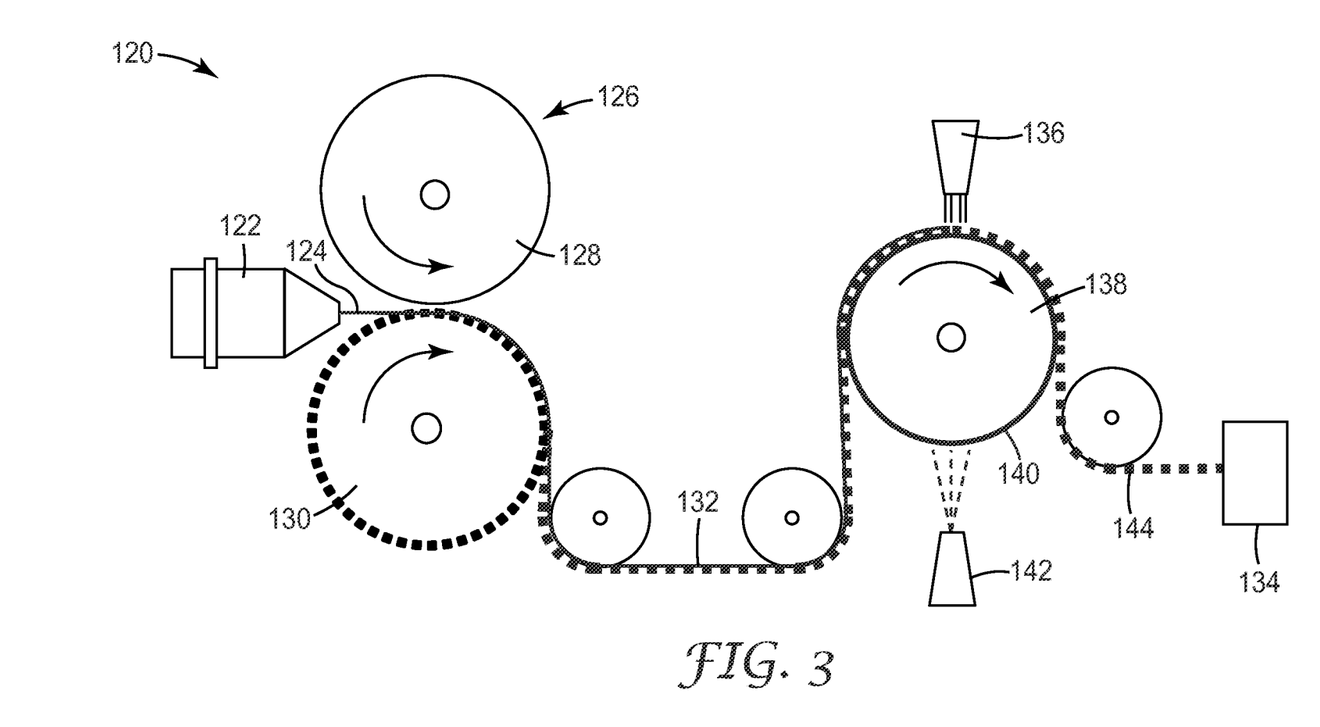
FIG. 3 is a schematic diagram of an exemplary apparatus suitable for making the microperforated polymeric films of the present disclosure.

Depending on the embossing process used and the manufacturing conditions, the cavities may not be identical positive replications of the tooling projections. For example, due to the pulling of the polymeric film in a roll process as shown in FIG. 3, the cavities and distance between cavities may be slightly stretched. If the projections are close together and depending on the line speeds and melt temperatures, the polymeric film may not completely form to the tooling, causing the valleys between the projections to not be completely filled with polymeric material. This may result in a non planar first surface of the microperforated polymeric film, such as that disclosed in FIG. 6.

Typically, a skin may be left covering or partially obstructing the bottom (or apex) of each cavity. To create channels in the polymeric film, the solidified polymeric film typically undergoes thermal treatment to displace the skins. Because the plurality of cavities typically turn into the plurality of channels (or through openings) after thermal treatment process, the cavity size, shape, and spacing is generally similar to that described for the channels above.

Displacing the Skins

In accordance with the present disclosure, a thermal treatment process is used to displace the skins to form the microperforated polymeric film Skin displacement may be performed using a number of different thermal treatments including, for example, forced air treatment, hot air treatment, flame treatment, radiant heat treatment (such as infrared), corona treatment, plasma treatment, ultrasonic, laser, or combinations thereof.

The thermal treatment is used to heat the first few polymer layers to temperatures at which the polymer readily flows. The molten polymer of the skin ruptures and retracts, thereby defining a through opening, or channel, in the polymeric film. Thermal treatment generally works well for polymer films that are thicker (e.g., greater than about 300 micrometers) and have a lower percent opening per unit area (e.g., less than 3%). The present disclosure provides a method of controlling the temperature of the polymeric film during the thermal treatment process to produce microperforated polymeric films with a large percentage open area and high density of openings.

In the present disclosure, a fluid is provided between the polymeric film and the support surface. Although not wanting to be bound by theory, it is believed that the fluid serves as an intimately-contacting heat sink and heat transfer pathway between the embossed polymeric film and the support surface. The polymeric material in contact with the fluid remains below its softening temperature even as the skin layer is exposed to the heat source, thus maintaining strength and dimensional integrity of the polymeric film. An additional advantage is the potential vaporization of the fluid, which can cause a pressure increase within the cavities of the embossed polymeric film, assisting in perforating the film.

Fluids of the present disclosure include those that are non-flammable. Exemplary fluid include, water, and fluorinated solvents.

Various embodiments for application of the fluid to the embossed polymeric film prior to thermal treatment can be envisioned. For example, a syringe pump and needle die may be used to apply the fluid although other methods of applying fluid may also be employed. The fluid may be applied directly to the embossed polymeric film or to the support surface, which supports and generally cools the polymeric film during the thermal treatment process.

In one embodiment, the support surface is smooth (i.e., no noticeable surface pattern).

If the fluid is applied directly to the support surface and depending on the composition of the fluid, the support surface may be modified to enable better wetting. In one embodiment, a textured pattern may be etched or engraved into the support surface. See for example, the method disclosed in U.S. application Ser. No. 12/362,048 (Ehnes, et al.). The capillary forces of the fine grooves on the support surface may hold the fluid in a thin film of uniform thickness, preventing the beading of the fluid, which may result in inconsistently displaced skins across the microperforated polymeric film. Texture of the support surface means that any two dimensions (length, width, and/or depth) of the texture are less than or equal to 100, 75, 50, 20 or even 10 micrometers in length. In one embodiment, less than 30% or even 20% of the surface of the textured support surface is flat (i.e., not textured).

In another embodiment, the support surface may be covered with, for example, a high surface energy coating or finish to enable better wetting of the fluid.

In yet a further embodiment, an additional flat film (or secondary film) may be introduced between the support surface and the embossed polymeric film prior to thermal treatment. The fluid may be applied to the top surface of the secondary film prior to contacting with the embossed polymeric film. Still further, a fluid saturated fibrous web may be introduced between the support surface and the embossed polymeric film prior to thermal treatment. The fibrous web could be paper based, nonwoven or woven fabric in nature. Additional coating methods may be used to coat fluid onto the back side of the film or surface of the chill roll. Methods include roll coating, curtain coating, contact die, spray coating, enclosed doctor blade or sponge type transfer coating methods.

By controlling the fluid, the melting and displacement of the skins can be controlled. For example, if small droplets of fluid are sprayed onto the first surface of the embossed polymeric film, the skins may not be displaced during the thermal treatment. If the cavities in the embossed polymeric film are completely filled with the fluid, which can act as a heat sink, the skins may not get warm enough during the thermal treatment and thus, the cavities or a portion of the cavities will not open into a channel.

When using thermal displacement treatment, such as a flame treatment, to displace the skins, the thermal energy is typically applied from the side of the film bearing the skin while a metal surface (e.g., a roll) acting as a heat sink, may be provided against the opposite surface, to draw heat from the bulk portions so that the bulk portions of the film do not deform during the thermal displacement treatment. During the thermal energy treatment, the film may also be maintained under tension during and/or after the thermal energy treatment to assist in opening the openings. This may be done, for example, by applying positive pressure or vacuum to one side of the film.

A variety of burners for thermal displacement treatment are commercially available, for example, from Flynn Burner Corporation, New Rochelle, N.Y.; Aerogen Company, Ltd., Alton, United Kingdom, and Sherman Treaters Ltd., Thame, United Kingdom. One preferred burner is commercially available from Flynn Burner Corporation as Series 850, which has an eight-port, 32 inch (81.3 cm) actual length that was deckled to 27 inch (68.6 cm) in length, stainless steel, deckled ribbon mounted in a cast iron housing. A ribbon burner is most preferred for the flame perforation of polymeric films, but other types of burners such as drilled-port or slot design burners may also be used. Typically, an oxidizer is mixed with the fuel before it feeds the flame used in the flame-perforating process of the disclosure.

FIG. 3 illustrates a schematic diagram of an exemplary extrusion embossing system for forming microperforated polymeric film in accordance with one embodiment of the disclosure.

The exemplary extrusion embossing system 120 generally includes an extrusion die 122 from which polymeric film 124 is extruded. The extrusion die 122 lies in fluid communication with nip roll system 126, which includes a first roll 128 having a generally flat exterior surface (backup roll) and a second roll 130 having posts on its exterior surface (tooling roll). The polymeric film 124 generally flows between the first and second rolls 128 and 130, conforms to the posts, and solidifies to form the embossed polymeric film 132. In one embodiment, a sacrificial polymeric film is provided between polymeric film 124 and first roll 128 to provide more uniform pressure against second roll 130.

In some embodiments, the embossed polymeric film 132 moves out of the nip roll system 126 to a storage bin 134 for temporary storage. The storage bin 134 may, for example, be a winding roll upon which the embossed polymeric film is wound. Alternatively, the storage bin 134 may be a sheet bin which stores cut sheets of the embossed polymeric film 132.

As depicted in FIG. 3, however, the exemplary system 120 includes a displacement treatment system 136 for displacing skins covering the cavities on the embossed polymeric film to create the microperforated polymeric film 144. Here, the displacement treatment system 136 is provided in-line between nip roll system 126 and storage bin 134. Alternatively, the displacement treatment system 136 may be an out-of-line system where stored embossed polymeric film from the storage bin 134 is moved to another assembly line having the displacement treatment system 136. While a roll-based process provides significant cost savings, a step wise process using, for example, a sheet-like tool system, rather than a nip roll system, may alternatively be used.

As further depicted in FIG. 3, backing roll 138 is provided opposite the displacement treatment system. Preferably, the support surface 140 of the backing roll 138 is temperature-controlled, relative to the ambient temperature around the exemplary system 120. The support surface 140 of the backing roll 138 may be temperature-controlled by any means known in the art. For example, the support surface 140 of the backing roll 138 may be cooled by providing cooled water through a hollow shaft in backing roll 138.

In one embodiment, support surface 140 is smooth, (i.e., does not contain any features). In another embodiment, support surface 140 includes a textured pattern on the support surface 140. The textured pattern may be a plurality of fine grooves or indentations along the support surface 140. Alternatively, other suitable means like ablation or drilling could be used to create an acceptable texture pattern. In preferred embodiments of the methods described herein, a fluid is provided between the embossed polymeric film 132 and support surface 140. The manner in which the fluid may be applied to the support surface may be varied by one skilled in the art, depending on the pressure, rate or velocity of the fluid pumped through the fluid applicator 142.

In one embodiment of the present disclosure, the support surface is cooled to 20° C., 15° C., 10° C. or even 5° C.

The apparatus may be modified to include an oxygen enriched flame as described in U.S. Publ. No. 2005/0073070 (Getschel et al.).

Applications

The microperforated polymeric films and processing techniques discussed above provide a number of advantages. As compared to conventional fibrous materials and perforated sheet materials, the above microperforated polymeric films are relatively inexpensive to form and are capable of wider use. The use of post molding provides a relatively inexpensive method of forming high aspect ratio openings. The use of post molding also provides significant quality advantages over other methods of generating perforations in films. For example, post molding generates significantly less debris or particulate matter than, for example, mechanical punching, drilling or boring techniques. The above process also allows for continuous processing and can provide significant cost savings over conventional processing methods. Further, using the methods as disclosed herein, may enable the fabrication of microperforated polymeric films having opening of various shapes and tightly controlled feature sizes.

These microperforated polymeric films of the present disclosure may be used in variety of applications, for example, filtering or acoustics. In one embodiment, the microperforated polymeric films of the present disclosure may be used for filtering liquids or gases. For example, a mixture comprising particulates may be contacted with a microperforated polymeric film as disclosed herein, and the microperforated polymeric film may be used to filter the mixture.

In one embodiment, the microperforated polymeric films according to the present disclosure may be used as filters in paint sprayers of the kind disclosed in W.O. Publ. No. 2006/055138 (Joseph et al.) and U.S. Publ. No. 2006/0049099 (Chang).

For example, the microperforated polymeric film according to the present disclosure comprises channels or openings, which may serve as passages through the filter. Objects in a sample larger than the openings are blocked from passage. Novel features of using the microperforated polymeric films of the present disclosure for particulate filtering include the ability to optimally shape the fluid passages and precisely controlled feature sizes. These features may result in a superior filter that minimizes pressure drop, while precisely limiting the size of particles that can pass through.

For example, circular-shaped openings are superior for minimizing pressure drop across a filter (assuming the same percent open area, thickness, etc.). The circular shape has minimum perimeter length and, hence, the opening has the least amount of surface-to-fluid contact area. This produces the least pressure drop since shear stresses in the fluid are proportionate to the contact area. Therefore, as with particle size control, it is preferable to make openings as circular as possible.

Microperforated polymeric films used in high flow rate and other physically demanding applications need to be strong to resist bursting, tearing, and other high stress failure modes. Achieving suitable physical strength with highly perforated polymeric films of the present disclosure may be strengthened or reinforced. Some embodiments having enhanced physical properties include: the selection of a resin system that gives suitable physical strength along with superior chemical and moisture resistance. Additionally, embedded fibers, reinforcing ribs or carrier fabric may be used. Embedded fibers are fibers incorporated into the molten extrudate to provide structural support in the extruded film. Reinforcing ribs are wide and/or thick support members incorporated at intervals in the extruded film. A carrier fabric is a supporting fabric that can be attached to the microperforated film. Spacing of the fibers in the supporting fabric may be substantially greater than the openings so as not to interfere with filtering performance. The fabric can be attached at the extruding step, or later by way of a lamination process.

In one embodiment, a multilayered filter device comprises the microperforated polymeric film as disclosed herein and a second permeable material extending across at least a portion of the microperforated polymeric film. The second permeable material captures the largest objects. This prevents the larger objects from quickly plugging the first layer microreplicated polymeric film, thereby extending the life of the filter. This embodiment may be facilitated by one or more spacings between the layers. The spacing(s) may be created by a plurality of spacers, which are integral with at least one of the microperforated polymeric film or the second polymeric film. These spaces create a fluid flow gap between the adjacent layers. In this way, when a large object plugs an outer opening(s), the fluid is still able to access the filter layers beneath the plugged region. This may extend filter life and enhance performance. In one embodiment, the second permeable material is a second microperforated polymeric film.

In another variant of the multi-layer construction comprises an outer layer of a non-woven-type material, and a microperforated polymeric films disclosed herein. The non-woven type material is effective at capturing large and gelatinous objects without substantially blocking fluid flow through the underlying filtering layers.

Items of the Disclosure

Described below are various embodiments of the disclosure.

Item 1. A method of forming a microperforated polymeric film comprising:

providing a polymeric film comprising opposed first and second surfaces and a plurality of cavities there between, wherein the plurality of cavities is open to the first surface and includes a cavity surface wherein the cavity surface intersects the first surface;

providing a fluid between a support surface and the first surface; and exposing the second surface to a thermal treatment to perforate the polymeric film in the areas covering the plurality of cavities.

Item 2. The method of item 1 wherein a layer of gas separates the fluid from the apex of the cavity of at least some of the plurality of cavities.

Item 3. The method of any one of the previous items, wherein the fluid is water.

Item 4. The method of any one of the previous items, wherein the support surface is a chilled roller.

Item 5. The method of any one of the previous items, wherein the thermal treatment is one of: flame, hot air, radiant heat, and combinations thereof.

Item 6. The method of any one of the previous items, wherein the support surface comprises at least one of: a texture, a coating, and combinations thereof.

Item 7. The article made by the method of any one of items 1 to 6, wherein the article is a particulate filter for liquids or gases.

Item 8. A microperforated polymeric film comprising: comprising: (i) opposed first and second surfaces separated by a first certain distance; and (ii) a plurality of channels perpendicular to the first and second surfaces, wherein a first opening of each channel intersects the first surface and a second opening of each channel intersects the second surface;

wherein the diameter of the first opening is larger than the diameter of the second opening and the second openings on the second surface are spaced apart by a second certain distance; wherein the ratio of the first certain distance to the second certain distance is at least 0.25; and further wherein the second surface has an open area of at least 10%.

Item 9. The microperforated polymeric film of item 8, wherein the distance between the opposed first and second surfaces is at least 75 micrometers.

Item 10. The microperforated polymeric film according to any one of items 8-9, wherein the microperforated polymeric film is selected from a polyolefin.

Item 11. The microperforated polymeric film according to any one items 8-10, wherein the channel has tapered walls.

Item 12. The microperforated polymeric film according to any one of items 8-11, wherein the second opening is elliptical or round in shape.

Item 13. The microperforated polymeric film according to any one of items 8-12, wherein the second openings are less than 500 microns in diameter.

Item 14. The microperforated polymeric film according to any one of items 8-13, further comprising at least one of embedded fibers, or integral ribs extending along at least one major surface.

Item 15. The microperforated polymeric film according to any one of items 8-14, wherein the second certain distance is at least 75 micrometers.

Item 16. A microperforated polymeric film comprising: (i) opposed first and second surfaces; and (ii) a plurality of channels perpendicular to the first and second surfaces, wherein a first opening of each channel intersects the first surface and a second opening of each channel intersects the second surface; wherein the diameter of the first opening is larger than the diameter of the second opening; wherein the second surface has an open area of at least 20%; and further wherein the second surface comprises at least 6,000 openings per square inch.

Item 17. A multilayered filter device comprising:
(a) the microperforated polymeric film according to any one of items 8-16; and
(b) a second permeable material extending across at least a portion of the microperforated polymeric film.

Item 18. The multilayered filter device of item 17, wherein the plurality of spacers is integral with at least one of the microperforated polymeric film or the second permeable material.

Item 19. A method of filtering particulates comprising:
(a) providing a microperforated polymeric film according to any one of items 8-16;
(b) providing a mixture comprising particulates; and
(c) contacting the mixture to the microperforated polymeric film so as to filter the mixture.

Item 20. The method of filtering particulates of item 19, wherein the mixture is a paint.

EXAMPLES

Advantages and embodiments of this disclosure are further illustrated by the following examples, but the particular materials and amounts thereof recited in these examples, as well as other conditions and details, should not be construed to unduly limit this disclosure. In these examples, all percentages, proportions and ratios are by weight unless otherwise indicated. All materials are commercially available, for example from Sigma-Aldrich Corporation, St. Louis, Mo., or known to those skilled in the art unless otherwise stated or apparent.

These abbreviations are used in the following examples: cm=centimeter, °F.=Fahrenheit, °C.=Centigrade, rpm=revolutions per minute, m=meter, min=minutes, N=Newtons, lbf=pound force, μm=micrometer, hr=hour, s=second, mm=millimeter, and mL=milliliter.

Methods

Extrusion and Embossing Process

A polypropylene homopolymer having a melt flow index (MFI) of 35, available under the trade designation "POLYPROPYLENE 3868" from Total Petrochemical USA, Inc., Port Arthur, Tex., was extruded using a 6.35 cm (2.5 inch) single screw extruder (DS-25, Davis-Standard, LLC, Pawcatuck, Conn.) with a cast film extrusion die (30.48 cm (12-inches) wide with a 508 micrometer (20 mils) nominal die gap).

The molten polymer resin (i.e., extrudate) was fed into a vertical two roll nip comprising a tooling roll and backup roll. The 30.48 cm (12-inch) diameter tooling roll comprises hexagonally shaped posts configured in a frusto-hexagonal array pattern, with a positive sidewall angle of about 10 degrees. The height of the posts was approximately 250 μm, with a distal width (i.e., distance between opposing sides across the hexagonal post top) of 225 micrometers and a channel width (i.e., distance between the edge of one hexagonal post and its nearest neighbor on the top of the tool) of 150 micrometers. The 30.48 cm (12-inch) diameter backup roll comprised a 0.635 cm (0.25 inch) 80 durometer (Shore A) rubber covering, type "SS100" from American Roller Company, Waterbury, Conn. A sacrificial 75 micrometer (3 mil) polyester teraphthlate (PET) film was fed between the backup roll and the molten polymer resin, and was removed after embossing and solidifying of the polymeric film. The polymeric film was a positive of the tooling, comprising cavities where the posts of the tool were contacted. Because of the nip force between the tooling roll and the backup roll, a thin film (i.e., a skin) was left between the bottom of each cavity and the second surface of the embossed polymeric film.

Extrusion process conditions are listed in Table 1.

TABLE 1

| | |
|---|---|
| Extruder and Die Temperature Setting | 204° C. (400° F.) |
| Extruder screw speed | 15 rpm |
| Tooling Roll Temperature | 21° C. (70° F.) |
| Backup Roll Temperature | 21° C. (70° F.) |
| Nip Force | 13,344 N (3000 Pound-Force) |
| Line Speed | 12.2 m/min (40 feet/min) |

Flame Treatment Process

The embossed polymeric film, skin side out, was wrapped around a single, smooth, water-cooled chill roll 30.48 cm (12-inch) in diameter. The chill roll temperature was controlled to 21° C. (70° F.). The embossed film was exposed to a propane fired, 8-port aluminum burner (30.48 cm (12 inch) Extruded Aluminum 861 Series Ribbon Burner, from Flynn Burner Corporation, New Rochelle, N.Y.). Burner-to-film gap was 20.3 mm, the energy output was 288.5 Watt hours/cm (2500 British Thermal Units/Hour/inch) at a line speed of 12.2 m/min (40 ft/min).

Figure 4A:
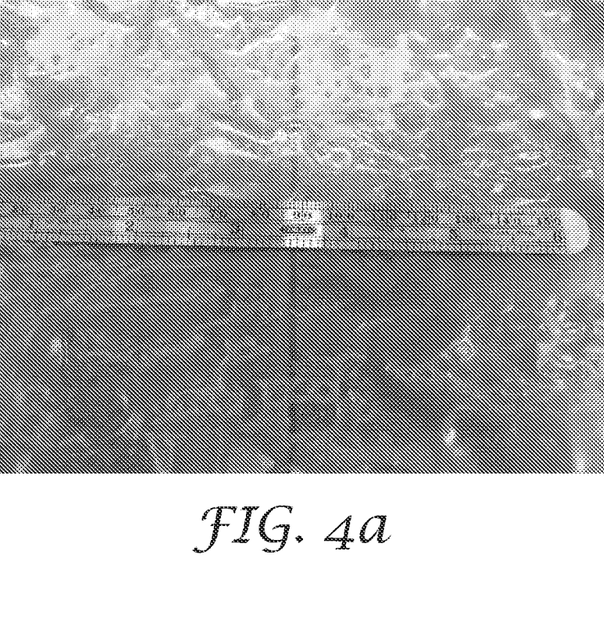
FIGS. 4a and 4b are top view pictures of representative portions of a microperforated polymeric film according to Comparative Example A.
Figure 4B:
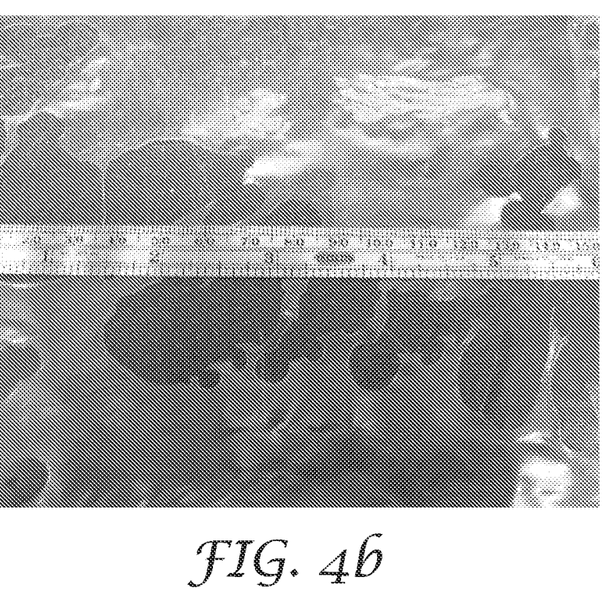

Comparative Example A was prepared following the Flame Treatment Process above. The resulting polymeric film showed complete failure, i.e., uncontrolled melting and bubbling over substantially all areas of the polymeric film as shown in FIGS. 4a and 4b. It is believed that the embossed film was not sufficiently cooled by the chill-roll during the flame treatment, resulting in large-scale, uncontrolled melting of the film with no apparent channels (or through openings) in any substantial portion of the film.

Figure 5:
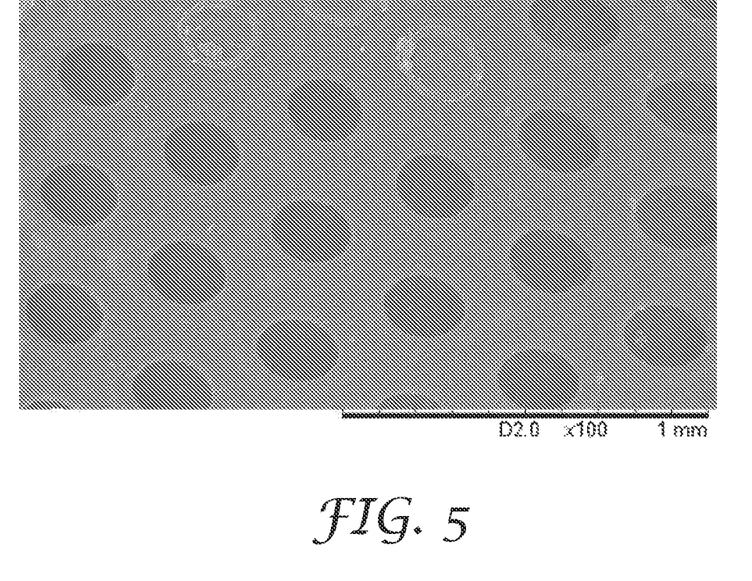
FIG. 5 is a top view picture of a representative portion of the second surface of a microperforated polymeric film according to Example 1.

Example 1 was prepared as described in Comparative Example A except that deionized water was used between the chill roll and the embossed polymeric film during the flame treatment. The deionized water was applied to the first major surface of the embossed film approximately two feet up-web before the embossed film contacted the chill roll. The deionized water was applied by means of a syringe pump and a water spray die, as described in U.S. Pat. No. 5,115,972 (Maier et al.). The deionized water was sprayed using 19 nozzles over a 23 cm (9 inch) span, having a flow rate of 37 mL/min with an air pressure of 103,400 N/m$^2$ (15 psi). After flame treatment, the resulting polymeric film was dimensionally well preserved, but exhibited variability in skin displacement. Many cavities were fully opened, creating clean through openings, but some cavities were only partially opened or not opened at all. A representative film is shown in FIG. 5.

Figure 6:
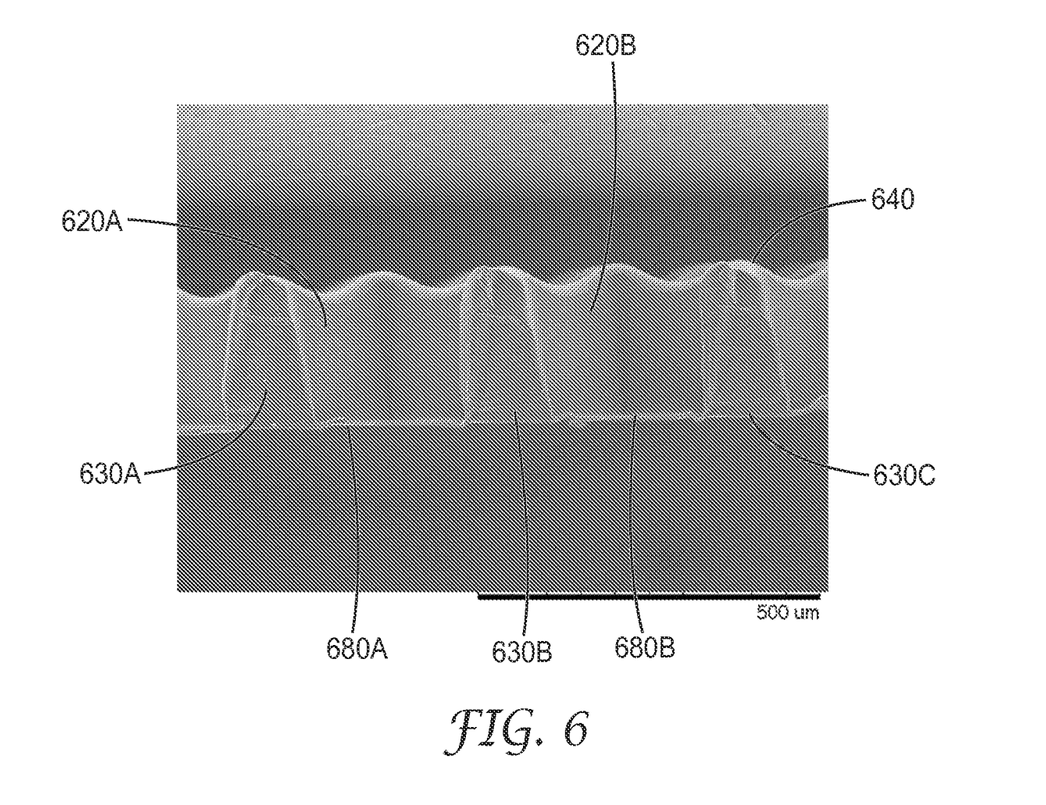
FIG. 6 is a cross-sectional picture of a representative portion of an embossed polymeric film according to Example 2.

Example 2 was prepared as described in Example 1 except for changes made to the chill roll surface and where the deionized water was applied. The smooth, water-cooled chill roll was substituted with a water-cooled chill roll having an engraved pattern comprised of pyramids, 62 micrometer pitch, 30 micrometers high, 10 degree bias angle on one side, and a 90 degree tip angle, as described in U.S. application Ser. No. 12/362,048 (Ehnes, et al.). The nozzles were positioned opposite from the flame as shown in FIG. 3, applying the deionized water directly onto the chill roll before the chill roll contacted the embossed film. Shown in FIG. 6 is a cross sectional view of the embossed polymeric film. Surface 640 is the first surface of the polymeric film contacting the tooling. Because of the processing conditions, the polymeric film did not completely fill the tooling, resulting in a "waffle type" surface. In the figure, two full cavities (620A and 620B) and three polymer sections separating the cavities (630A, 630B, and 630C) are observed. Careful inspection of FIG. 6 shows the thin skins (680A and 680B) at the bottom of cavities 620A and 620B, respectively.

Figure 7:
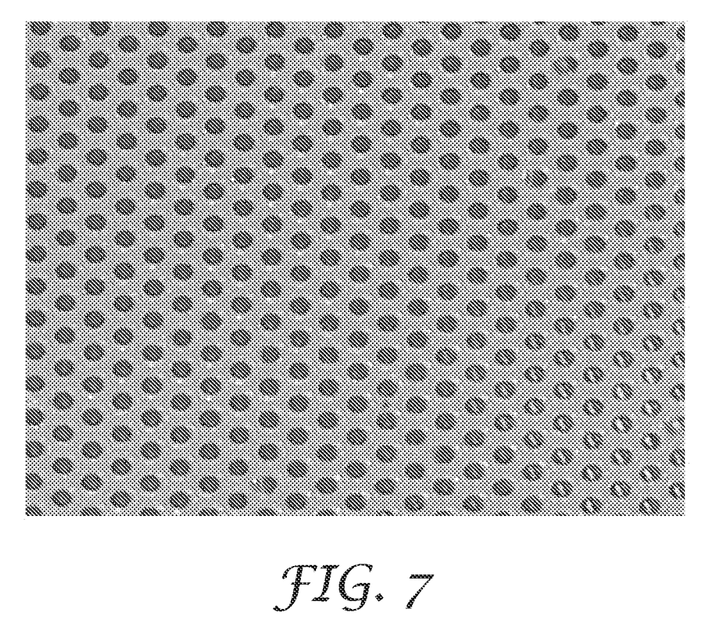
FIG. 7 is a magnified top view picture of a portion of the second surface of a microperforated polymeric film according to Example 2.
Figure 8A:
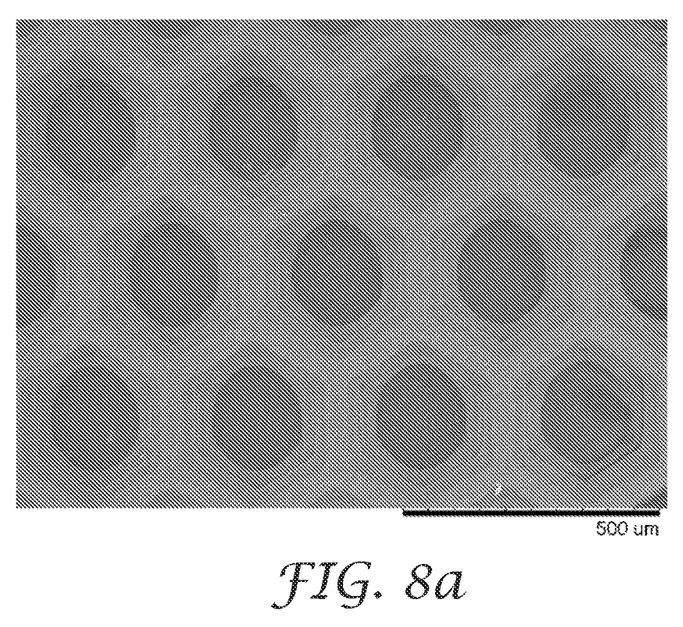
FIG. 8a is a further magnified top view picture of a representative portion of the first surface of a microperforated polymeric film according to Example 2.
Figure 8B:
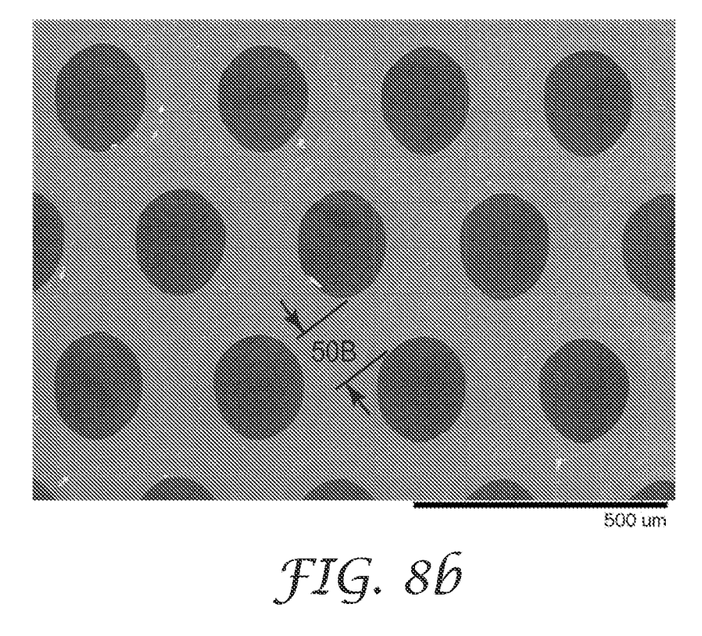
FIG. 8b is a further magnified top view picture of a representative portion of the second surface of a microperforated polymeric film according to Example 2.
Figure 8C:
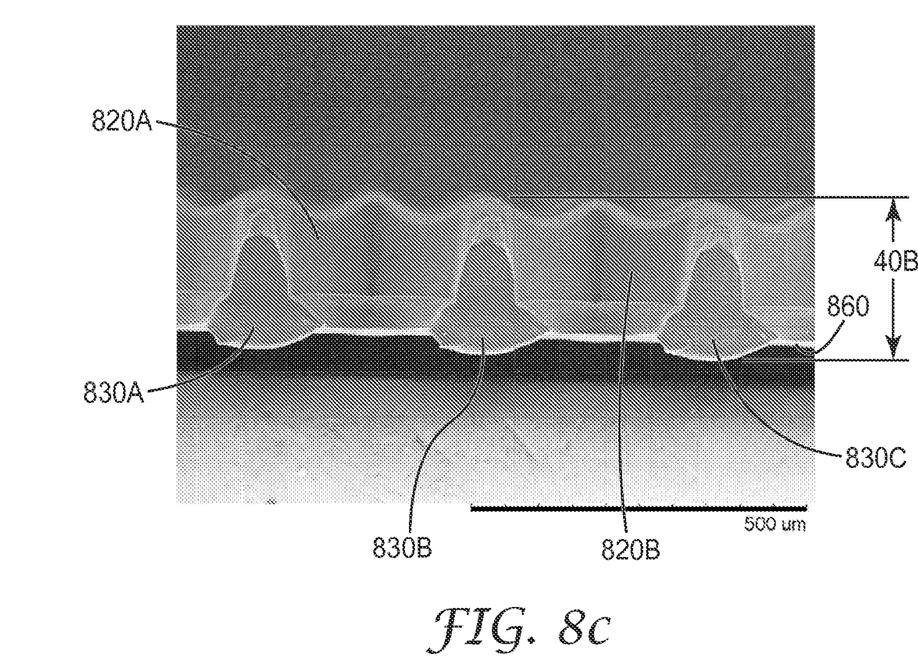
FIG. 8c is a cross-sectional picture of a microperforated polymeric film according to Example 2.

After flame treatment, the resulting microperforated polymeric film showed uniform openings of the cavities, while maintaining the integrity of the film. A representative film is shown in FIGS. 7 and 8a-8c. FIG. 7 is a top view of the second surface of a portion of the microperforated polymeric film. FIG. 8a is a further magnified top view of the first surface of the microperforated polymeric film. The channels are tapered with the larger diameter first openings being hexagonal in shape, while the smaller diameter second openings are oval in shape. FIG. 8b is a further magnified top view of the second surface of microperforated polymeric film, only the second openings of the plurality of channels is observed. Also depicted on FIG. 8b is 50B, which is the minimum distance (second certain distance) between adjacent openings on the second surface. FIG. 8C is a cross-sectional view of the microperforated polymeric film. Surface 860 is the second surface of the polymeric film which was exposed to the thermal treatment. The skins have been displaced, resulting in channels (or through openings). In FIG. 8c, two full channels (820A and 820B) and three polymer sections separating the cavities (830A, 830B, and 830C) are observed. Comparing FIGS. 6 and 8C, one can note the differences in shape of the cavities versus the channels and the change in the polymer sections separating the cavities as a result of the thermal treatment.

The distance between the first and second surface (i.e., the first certain distance, e.g., distance 40B in FIG. 8c) of the microperforated polymeric film was measured to be 229 micrometers (9 mils) using a micrometer (Model 49-70-01-001 from Testing Machines, Inc., Ronkonkoma, N.Y.). The minimum distance (i.e., the second certain distance, e.g., distance 50B in FIG. 8b) between two adjacent second openings on the second surface was measured to be 140 micrometers (5.5 mils) using a bench-top microscope (TM-1000, Hitachi High-Technologies America, Inc., Pleasanton, Calif. The ratio of the first certain distance to the second certain distance for Example 2 was calculated to be 1.63. The hole density was 982 holes/cm$^2$ (6336 holes per square inch) with an open area of 32%.

Example 3 was prepared as described in Example 2, with the following exceptions: the polymer was a blend comprising 25% of the polypropylene homopolymer and 75% of a polyolefin elastomer (an ethylene-octene copolymer) available under the trade designation "ENGAGE 8401" obtained by Dow Plastics, Midland, Mich.; and the process conditions shown in Table 2 were used. The resulting microperforated polymeric film showed uniform openings.

TABLE 2

| Extruder and Die Temperature Setting | 190° C. (375° F.) |
| Extruder screw speed | 15 rpm |
| Tooling Roll Temperature | 21° C. (70° F.) |
| Backup Roll Temperature | 21° C. (70° F.) |
| Nip Force | 14679 N (3300 Pound-Force) |
| Line Speed | 11.6 m/min (38 feet/min) |

Foreseeable modifications and alterations of this disclosure will be apparent to those skilled in the art without departing from the scope and spirit of this disclosure. This disclosure should not be restricted to the embodiments that are set forth in this application for illustrative purposes.

What is claimed is:

1. A method of forming a microperforated polymeric film comprising:
    providing a polymeric film comprising opposed first and second surfaces and a plurality of cavities there between, wherein the plurality of cavities is open to the first surface and includes a cavity surface wherein the cavity surface intersects the first surface, wherein the polymeric film comprises a film thickness of 50 to 800 micrometers;
    providing a liquid between a support surface and the first surface; and
    exposing the second surface to a thermal treatment to perforate the polymeric film in the areas covering the plurality of cavities.

2. The method of claim 1 wherein a layer of gas separates the liquid from the apex of the cavity of at least some of the plurality of cavities.

3. The method of claim 1, wherein the fluid is water.

4. The method of claim 1, wherein the support surface is a chilled roller.

5. The method of claim 1, wherein the thermal treatment is one of: flame, hot air, radiant heat, and combinations thereof.

6. The method of claim 1, wherein the support surface comprises at least one of: a texture, a coating, and combinations thereof.

7. The method of claim 1, wherein the diameter of the cavity surface is at least 100 micrometers.

8. The method of claim 1, wherein the surface of the support surface is smooth.

* * * * *